(12) United States Patent
Sugiura et al.

(10) Patent No.: US 11,415,039 B2
(45) Date of Patent: Aug. 16, 2022

(54) STRUCTURE FOR EXHAUST PURIFICATION

(71) Applicants: Koji Sugiura, Toyota (JP); Hiromasa Nishioka, Susono (JP); Naoto Miyoshi, Nagoya (JP); Akemi Sato, Toyota (JP); Masatoshi Ikebe, Kakegawa (JP); Ryota Nakashima, Kakegawa (JP); Yasutaka Nomura, Kakegawa (JP)

(72) Inventors: Koji Sugiura, Toyota (JP); Hiromasa Nishioka, Susono (JP); Naoto Miyoshi, Nagoya (JP); Akemi Sato, Toyota (JP); Masatoshi Ikebe, Kakegawa (JP); Ryota Nakashima, Kakegawa (JP); Yasutaka Nomura, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 16/851,169

(22) Filed: Apr. 17, 2020

(65) Prior Publication Data
US 2020/0332698 A1 Oct. 22, 2020

(30) Foreign Application Priority Data
Apr. 22, 2019 (JP) .............................. JP2019-081148

(51) Int. Cl.
*F01N 13/18* (2010.01)
*F01N 3/08* (2006.01)
*F01N 3/10* (2006.01)

(52) U.S. Cl.
CPC ........ *F01N 13/1838* (2013.01); *F01N 3/0821* (2013.01); *F01N 3/106* (2013.01)

(58) Field of Classification Search
CPC ........ B01D 2255/9035; B01D 53/9472; F01N 2510/0682; F01N 2510/0684; F01N 3/106;
(Continued)

(56) References Cited

U.S. PATENT DOCUMENTS

| 8,216,521 B2 * | 7/2012 | Li .......................... F01N 3/2073 422/177 |
| 8,756,926 B2 * | 6/2014 | Chandler .............. F01N 3/0821 60/301 |

(Continued)

FOREIGN PATENT DOCUMENTS

| EP | 3581271 A1 | 12/2019 |
| JP | 2010065554 A | 3/2010 |

(Continued)

*Primary Examiner* — Anthony Ayala Delgado
(74) *Attorney, Agent, or Firm* — Dickinson Wright, PLLC

(57) ABSTRACT

There is provided a structure including: a substrate including a first and a second ends, and a porous partition wall defining a first and a second cells extending between the first and the second ends; a first catalyst; and a second catalyst. In a first area, the first catalyst is disposed on a first surface of the partition wall, and the partition wall with the first catalyst disposed on the partition wall is impermeable to gas. In a second area, the first catalyst is not provided, the second catalyst is disposed in a region including at least a part inside the partition wall, the part facing the first cell, and the partition wall with the second catalyst disposed in the partition wall is permeable to gas. In a third area, any of the first catalyst or the second catalyst is not provided, and the partition wall is permeable to gas.

3 Claims, 2 Drawing Sheets

(58) Field of Classification Search
CPC ........ F01N 3/101; F01N 3/0821; F01N 3/035;
F01N 13/1838; F01N 3/2828
See application file for complete search history.

(56) References Cited

U.S. PATENT DOCUMENTS

| | | | |
|---|---|---|---|
| 9,657,625 B2* | 5/2017 | Boorse | F01N 3/2066 |
| 10,626,765 B2* | 4/2020 | Inoda | B01J 35/0006 |
| 10,669,910 B2* | 6/2020 | Chen | B01D 53/9418 |
| 2008/0020922 A1* | 1/2008 | Li | B01J 23/63 |
| | | | 502/73 |
| 2011/0123421 A1* | 5/2011 | Gru | B01J 23/40 |
| | | | 423/212 |
| 2011/0154808 A1* | 6/2011 | Hirata | F01N 3/0821 |
| | | | 60/297 |
| 2012/0186229 A1* | 7/2012 | Phillips | B01J 29/072 |
| | | | 60/274 |
| 2017/0016366 A1* | 1/2017 | Suzawa | F01N 3/0821 |
| 2018/0080359 A1* | 3/2018 | Price | F01N 3/035 |
| 2018/0266290 A1* | 9/2018 | Burgess | B01J 29/763 |

FOREIGN PATENT DOCUMENTS

| | | |
|---|---|---|
| JP | 6386697 B | 8/2018 |
| JP | 6386697 B | 9/2018 |

* cited by examiner

STRUCTURE FOR EXHAUST PURIFICATION

CROSS REFERENCE TO RELATED APPLICATIONS

The present application claims priority from Japanese patent application JP 2019-081148 filed on Apr. 22, 2019, the content of which is hereby incorporated by reference into this application.

BACKGROUND

Technical Field

The present disclosure relates to a structure for exhaust gas purification.

Background Art

It has been known that an exhaust gas discharged from an internal combustion engine of an automobile and the like contains a Particulate Matter (PM) containing carbon as the main component, ash containing an incombustible component, and the like, and they cause the air pollution. As a filter for trapping and removing the particulate matter and the ash from the exhaust gas, a filter having a wall-flow structure has been widely used. A diesel particulate filter (DPF) for a diesel engine, a gasoline particulate filter (GPF) for a gasoline engine that discharges a certain amount of particulate matter, while it is less than the diesel engine does, together with the exhaust gas, and the like have been developed.

Here, the exhaust gas contains, in addition to the particulate matter, harmful components, such as carbon monoxide (CO), hydrocarbon (HC), and nitrogen oxides (NOx). These harmful components can be removed from the exhaust gas by a filter with a coating of a catalyst, such as a noble metal catalyst.

JP 2010-65554 A proposes an exhaust emission purification device for a diesel engine that removes NOx and PM in an exhaust gas. The exhaust emission purification device includes a DPF that includes multiple cells, and the cells are defined by a partition wall formed of a porous member and substantially parallel to an exhaust gas flow. The respective cells have inlets and outlets alternately sealed with sealers in a staggered pattern. The DPF has an exhaust gas inflow surface coated with a catalyst and a thin film in this order. The catalyst selectively reduces the nitrogen oxides. The thin film has fine pores of size which allows the nitrogen oxides to pass while the particulate matters to be prevented from passing.

Japanese Patent No. 6386697 proposes a particulate filter in which catalysts are supported. The particulate filter with the supported catalysts includes a substrate, a first catalyst layer, and a second catalyst layer. The substrate has a wall-flow structure that includes a porous partition wall, and the partition wall partitions inlet cells from outlet cells. The first catalyst layer is formed on a surface of the partition wall, on the side of the inlet cells, in a predetermined length along the extending direction of the cells from an exhaust gas inflow end section. The second catalyst layer is formed in the interior of the partition wall, in at least a part of a region facing the outlet cells, along the extending direction of the cells from an exhaust gas outflow end section.

SUMMARY

The filter used for exhaust gas purification causes a pressure loss of the exhaust gas, thereby reducing engine performance in some cases. Therefore, there has been desired for reducing the pressure loss caused by the exhaust gas purification filter. Accordingly, the present disclosure provides a structure applicable to an exhaust gas purification filter in which a pressure loss of an exhaust gas is reduced.

According to one aspect of the present disclosure, a structure includes a substrate, a first catalyst, and a second catalyst. The substrate includes a first end, a second end, and a porous partition wall that defines a plurality of cells. The plurality of cells extend between the first end and the second end. The plurality of cells include a first cell and a second cell. The first cell is opened on the first end and sealed on the second end. The second cell is adjacent to the first cell with the partition wall interposed between the second cell and the first cell. The second cell is sealed on the first end and opened on the second end. The structure includes a first area, a second area, and a third area. The first area is between the first end and a first position distant from the first end by a first distance along an extending direction of the plurality of cells. The second area is between the first position and a second position distant from the first position by a second distance toward the second end along the extending direction of the plurality of cells. The third area is between the second position and the second end. In the first area, the first catalyst is disposed on a first surface of the partition wall, the first surface facing the first cell, and the partition wall with the first catalyst disposed on the partition wall is impermeable to gas. In the second area, the first catalyst is not provided, the second catalyst is disposed in a region including at least a part inside the partition wall, the part facing the first cell, and the partition wall with the second catalyst disposed in the partition wall is permeable to gas. In the third area, any of the first catalyst or the second catalyst is not provided, and the partition wall is permeable to gas.

The exhaust gas purification filter using the structure of the present disclosure allows a reduction of the pressure loss.

DETAILED DESCRIPTION

Figure 1:
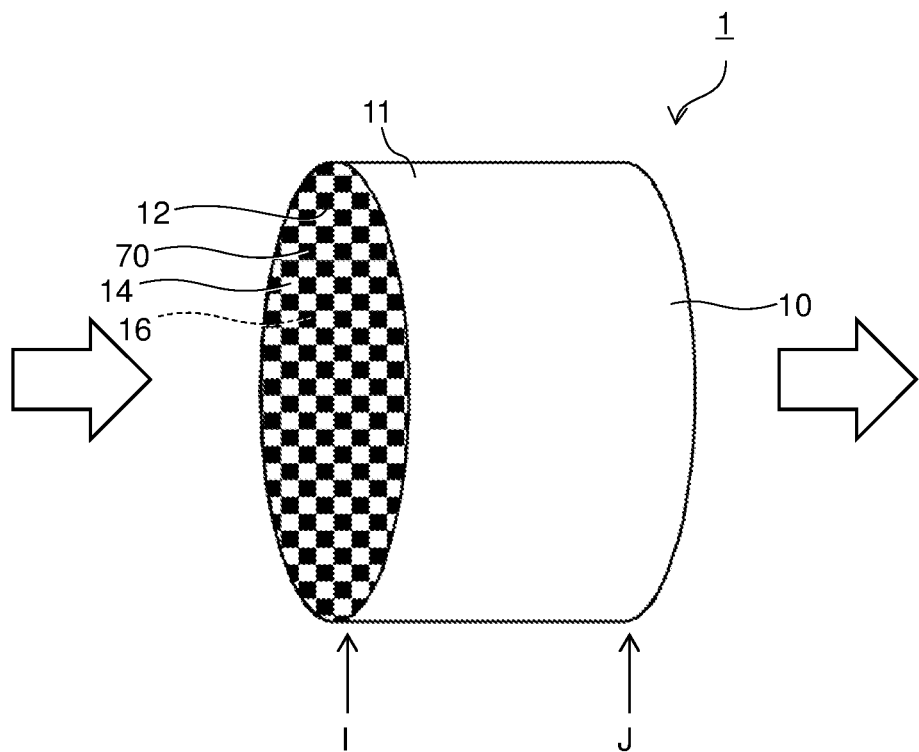
FIG. 1 is a schematic perspective view illustrating a structure according to an embodiment.

A structure 1 according to the embodiment will be described by referring to FIGS. 1 and 2. The structure 1 according to the embodiment includes a substrate 10, a first catalyst 30, and a second catalyst 50.

(1) Substrate 10

The substrate 10 includes a cylindrically-shaped frame 11 and a partition wall 12 that partitions an inner space of the frame in a honeycomb shape. The frame 11 and the partition wall 12 may be integrally formed. While the frame 11 of FIG. 1 has a cylindrical shape, the shape is not limited to this, and any shape, such as an elliptical cylindrical shape and a polygonal cylindrical shape, may be employed. The partition wall 12 extends between a first end (a first end surface) I and a second end (a second end surface) J of the substrate 10, and defines a plurality of cells extending between the first end I and the second end J. The plurality of cells include first cells 14 and second cells 16. The first cells 14 are opened on the first end I, and sealed (closed) on the second end J with sealers 70. The second cells 16 are sealed on the first end I with the sealers 70, and opened on the second end J. The first cells 14 and the second cells 16 are disposed adjacent to one another with the partition wall 12 interposed between them. While the first cells 14 and the second cells 16 may have square-shaped cross-sectional shapes taken along surfaces perpendicular to their extending directions, the respective shapes are not limited to them, and may be various geometric shapes, such as any polygon (for example, a hexagon and a octagon) including a quadrilateral, such as a parallelogram, a rectangular shape, and a trapezoidal shape, and a triangular shape, and a circular shape.

The partition wall 12 is formed of a porous material through which an exhaust gas can pass. The partition wall 12 may be formed of, for example, a ceramic, such as cordierite, aluminum titanate, silicon carbide (SiC), and mullite, or an alloy (for example, stainless steel). The partition wall 12 formed of the porous material includes pores through which the exhaust gas can pass. While the material of the frame 11 is not specifically limited, the frame 11 may be formed of, for example, a material similar to that of the partition wall 12.

Open arrows in FIG. 1 indicate a direction of the exhaust gas introduced into the structure 1 and discharged from the structure 1. The exhaust gas flows through the first end I and into the structure 1, and passes through the second end J to be discharged from the structure 1. Herein after, the first end is also referred to as an inlet end, and the second end is also referred to as an outlet end as necessary. As indicated by dashed arrows in FIG. 2, the exhaust gas flows through the inlet end I and into the first cells 14, flows into the second cells 16 adjacent to the first cells 14 after passing through the porous partition wall 12 dividing the first cells 14 from the second cells 16, and passes through the outlet end J to be discharged from the second cell 16. Hereinafter, the first cell is also referred to as an inlet cell, and the second cell is also referred to as an outlet cell.

The structure 1 includes three areas, that is, a first area X, a second area Y, and a third area Z, along an extending direction of the inlet cell 14 and the outlet cell 16 (that is, the extending direction of the partition wall 12, hereinafter occasionally referred to as the "extending direction"). The first area X is an area between the inlet end I and a first position K distant from the inlet end I by a first distance $D_X$ along the extending direction. The second area Y is an area between the first position K and a second position L distant from the first position K by a second distance $D_Y$ toward the outlet end J along the extending direction. The third area Z is an area between the second position L and the outlet end J. A sum of the first distance $D_X$, the second distance $D_Y$, and a third distance $D_Z$ between the second position L and the outlet end J is equal to the whole length of the partition wall 12. A sum of the first distance $D_X$ and the second distance $D_Y$ is smaller than the whole length of the inlet cell 14.

(2) First Catalyst 30

The first catalyst 30 is disposed on a first surface 12a of the partition wall 12 in the first area X, the first surface 12a facing the inlet cell 14. In the embodiment illustrated in FIG. 2, a layer (first catalyst layer) 32 including the first catalyst 30 is disposed on the first surface 12a of the partition wall 12 in the first area X.

In the first area X, the partition wall 12 with the first catalyst 30 disposed on the partition wall 12 is impermeable to gas. In the structure 1 illustrated in FIG. 2, the first catalyst layer 32 closes the pores of the partition wall 12 in the first area X, which can make the partition wall 12 impermeable to gas in the first area X. The arrangement of the first catalyst 30 is not limited to the arrangement illustrated in FIG. 2. For example, in addition to or instead of the first catalyst layer 32 illustrated in FIG. 2, the material including the first catalyst 30 may be disposed so as to enter the pores of the partition wall 12 through the first surface 12a of the partition wall 12 to close the pores. A layer without the first catalyst 30 may be formed on the first surface 12a of the partition wall 12 to close the pores of the partition wall 12, and the first catalyst 30 may be disposed on the layer. The "impermeable to gas" means that a gas does not substantially passes through, and specifically, it means having a gas permeation rate 0.1 times or less of a gas permeation rate of the partition wall 12 in the third area Z.

Figure 2:
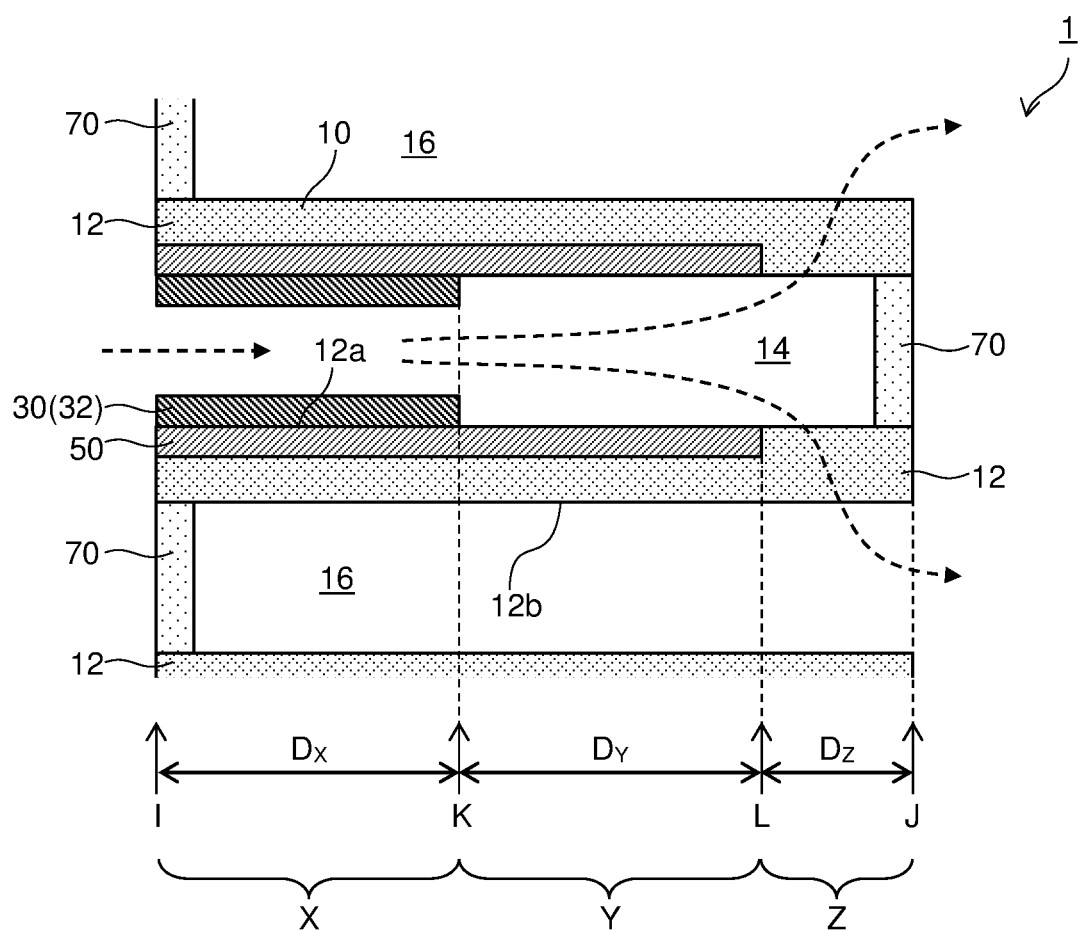
FIG. 2 is an enlarged end view of the main part of the structure according to one embodiment taken along a surface parallel to an extending direction of a cell, and schematically illustrating a configuration at a proximity of a partition wall.

In the embodiment illustrated in FIG. 2, the first catalyst 30 is not provided in the second area Y. "The first catalyst 30 is not provided in the second area Y" means that the first catalyst 30 is not substantially provided in the second area Y, and specifically, it includes a case where an amount of the first catalyst 30 that does not make the partition wall 12 impermeable to gas is disposed in a region close to the first area X in the second area Y. Also in the third area Z, the first catalyst 30 is not provided. "The first catalyst 30 is not provided in the third area Z" means that the first catalyst 30 is not substantially provided in the third area Z, and specifically, it includes a case where an amount of the first catalyst 30 that does not alter the gas permeability of the partition wall 12 is disposed in the third area Z.

As the first catalyst 30, a catalyst to oxidize HC may be used. For example, a precious metal, such as rhodium (Rh), palladium (Pd), and platinum (Pt), which belong to platinum group, and a metal, such as ruthenium (Ru), osmium (Os), iridium (Ir), silver (Ag), and gold (Au), are usable. An alloy of two or more kinds of them may be used. Another metal, such as an alkali metal, an alkaline earth metal, and a transition metal, may be used.

The first catalyst 30 may be supported on a carrier. The carrier includes a metal oxide, such as alumina ($Al_2O_3$), zirconia ($ZrO_2$), ceria ($CeO_2$), silica ($SiO_2$), magnesia (MgO), and titanium oxide (titania: $TiO_2$), and their solid solutions (for example, ceria-zirconia ($CeO_2$—$ZrO_2$) composite oxide). Two or more kinds of them may be used together.

The first catalyst 30 can be disposed on the first surface 12a of the partition wall 12 in the first area X, for example, as follows. First, a slurry containing the first catalyst 30 is prepared. The first catalyst 30 in the slurry may be supported on a carrier powder. The slurry may further contain a binder, an additive, and the like. The prepared slurry is applied to the first surface 12a of the partition wall 12 in the first area X. For example, the substrate 10 is dipped in the slurry from the inlet end I, and the substrate 10 is taken out from the slurry after an elapse of a predetermined period. Thus, the slurry can be applied to the first surface 12a of the partition wall 12. Alternatively, the slurry may be applied to the first surface 12a of the partition wall 12 by flowing the slurry through the inlet end I of the substrate 10 and into the inlet cell 14, and blowing a wind through the inlet end I with a blower to spread the slurry toward the outlet end J. Subsequently, by drying and sintering the slurry at a predetermined temperature for a predetermined period, the first catalyst 30 can be fixed on the first surface 12a of the partition wall 12.

The slurry containing the first catalyst 30 may have properties, such as a viscosity and a particle diameter of a solid component, appropriately adjusted such that the pores of the partition wall 12 are closed to make the partition wall 12 impermeable to gas and that the first catalyst 30 is disposed on the first surface 12a of the partition wall 12 in the first area X. For example, increasing the particle diameter of the solid component in the slurry allows a formation of the first catalyst layer 32 on the first surface 12a of the partition wall 12, which allows the first catalyst 30 to be disposed on the first surface 12a of the partition wall 12, and prevents the gas from passing through the partition wall 12 in the first area X.

(3) Second Catalyst 50

In the embodiment illustrated in FIG. 2, the second catalyst 50 is disposed inside the partition wall 12 in the first area X and the second area Y. The second catalyst 50 disposed in the first area X is not indispensable. The second catalyst 50 is disposed in a region of the partition wall 12, the region including at least a part facing the inlet cell 14. While the second catalyst 50 is disposed only in a region at a proximity of the first surface 12a of the partition wall 12 in FIG. 2, the disposition of the second catalyst 50 is not limited to this. The second catalyst 50 may be disposed also in a region at a proximity of a second surface 12b facing the outlet cell 16. The second catalyst 50 is disposed on an inner surface of the partition wall 12, the inner surface surrounding the pores, without closing all the pores inside the partition wall 12, which allows the partition wall 12 to be permeable to gas in the second area Y.

In the third area Z, the second catalyst 50 is not provided. "The second catalyst 50 is not provided in the third area Z" means that the second catalyst 50 is not substantially provided in the third area Z, and specifically, it includes a case where an amount of the second catalyst 50 that does not alter the gas permeability of the partition wall 12 is disposed in the third area Z.

As the second catalyst 50, a catalyst to reduce NOx may be used. For example, a precious metal, such as rhodium (Rh), palladium (Pd), and platinum (Pt), which belong to platinum group, and a metal, such as ruthenium (Ru), osmium (Os), iridium (Ir), silver (Ag), and gold (Au), are usable. An alloy of two or more kinds of them may be used. Another metal, such as an alkali metal, an alkaline earth metal, and a transition metal, may be used.

The second catalyst 50 may be supported on a carrier in the pores of the partition wall 12. The carrier includes a metal oxide, such as alumina ($Al_2O_3$), zirconia ($ZrO_2$), ceria ($CeO_2$), silica ($SiO_2$), magnesia (MgO), and titanium oxide (titania: $TiO_2$), and their solid solutions (for example, ceria-zirconia ($CeO_2$—$ZrO_2$) composite oxide). Two or more kinds of them may be used together.

The second catalyst 50 can be disposed inside the partition wall 12 in the first area X and the second area Y, for example, as follows. First, a slurry containing the second catalyst 50 is prepared. The second catalyst 50 in the slurry may be supported on a carrier powder. The slurry may further contain a binder, an additive, and the like. The prepared slurry is infiltrated into the partition wall 12 in the first area X and the second area Y. For example, the substrate 10 is dipped in the slurry from the inlet end I, and the substrate 10 is taken out from the slurry after an elapse of a predetermined period. Thus, the slurry can be infiltrated into the partition wall 12. Alternatively, the slurry can be infiltrated into the partition wall 12 by flowing the slurry through the inlet end I of the substrate 10 and into the inlet cell 14, and blowing a wind through the inlet end I with a blower to spread the slurry toward the outlet end J. Subsequently, by drying and sintering the slurry at a predetermined temperature for a predetermined period, the second catalyst 50 can be fixed inside the partition wall 12. Note that, after fixing the second catalyst 50 inside the partition wall 12, the first catalyst 30 may be disposed on the first surface 12a of the partition wall 12.

The slurry containing the second catalyst 50 may have properties, such as a viscosity and a particle diameter of a solid component, appropriately adjusted such that the slurry containing the second catalyst 50 internally infiltrates into the partition wall 12 and is disposed on the inner surface of the partition wall 12, the inner surface surrounding the pores, without closing all the pores of the partition wall 12 in the first area X and the second area Y. For example, decreasing the particle diameter of the solid component in the slurry ensures the infiltration of the second catalyst 50 into the inside of the partition wall 12 without closing the pores of the partition wall 12.

The gas permeability of the partition wall 12 in the first area X, the second area Y, and the third area Z of the structure 1 illustrated in FIG. 2 are each as follows.

As described above, in the first area X, the partition wall 12 with the first catalyst 30 disposed on the partition wall 12 is impermeable to gas.

In the second area Y, the first catalyst 30 is not provided while the second catalyst 50 is provided. The second catalyst 50 is disposed on the inner surface of the partition wall 12, the inner surface surrounding the pores, while the second catalyst 50 does not close all the pores of the partition wall 12. Therefore, in the second area Y, the partition wall 12 is permeable to gas. However, since the second catalyst 50 closes some of the pores or narrows the pores, the gas permeability is low compared with the partition wall 12 without the catalyst.

In the third area Z, any of the first catalyst 30 or the second catalyst 50 is not provided. Therefore, the gas permeability of the partition wall 12 in the third area Z is higher than the gas permeability of the partition wall 12 in each of the first area X and the second area Y.

An exhaust gas purification performance of the structure 1 having such gas permeability will be described below.

When the exhaust gas is introduced into the structure 1, the exhaust gas flows through the inlet end I of the substrate 10 and into the inlet cell 14 as indicated by the dashed arrows in FIG. 2. Since the exhaust gas cannot enter the partition wall 12 in the first area X, the exhaust gas moves and spreads inside the inlet cell 14 along the first catalyst layer 32 toward the second area Y. At this time, the exhaust gas contacts the first catalyst 30, which allows the oxidation of HC in the exhaust gas, thereby purifying the exhaust gas.

Subsequently, in the second area Y, a part of the exhaust gas passes through the inside of the partition wall 12 to flow into the outlet cell 16. At this time, the PM and ash in the exhaust gas are trapped on the surface and in the pores of the partition wall 12, and the exhaust gas contacts the second catalyst 50 inside the partition wall 12, which allows the reduction of NOx in the exhaust gas, thereby purifying the exhaust gas.

Meanwhile, the remaining exhaust gas without passing through the inside of the partition wall 12 in the second area Y moves and spreads inside the inlet cell 14 along the partition wall 12 toward the third area Z in the second area Y. At this time, the exhaust gas contacts the second catalyst 50 at the proximity of the first surface 12a of the partition wall 12, which allows the reduction of NOx in the exhaust gas, thereby purifying the exhaust gas. This exhaust gas passes through the inside of the partition wall 12 to flow into the outlet cell 16 in the third area Z. At this time, the PM and ash in the exhaust gas are trapped on the surface and in the pores of the partition wall 12.

The exhaust gas having flowed into the outlet cell 16 in the second area Y or the third area Z moves and spreads inside the outlet cell 16 along the partition wall 12 toward the outlet end J, and is discharged outside the structure 1 from the outlet end J.

As described above, in the third area Z, any of the first catalyst 30 or the second catalyst 50 is not provided, which allows the gas permeability of the partition wall 12 in the third area Z to be higher than the gas permeability of the partition wall 12 in each of the first area X and the second area Y where the first catalyst 30 and/or the second catalyst 50 is provided. Accordingly, most of the exhaust gas passes through the partition wall 12 in the third area Z where the catalyst is not provided. Meanwhile, in a conventional exhaust gas purification filter of a wall-flow type, the catalyst is disposed on and/or in the whole partition wall. The exhaust gas introduced into the conventional exhaust gas purification filter passes through the partition wall on and/or in which the catalyst is disposed. The partition wall with the catalyst disposed thereon and/or therein has low gas permeability (that is, a resistance is high) compared with the partition wall 12 in the third area Z of the structure 1 according to the embodiment. Therefore, a pressure loss caused by passing through the partition wall of the conventional filter is greater than a pressure loss caused by passing through the partition wall 12 in the third area Z of the structure 1 according to the embodiment. Accordingly, the pressure loss of the exhaust gas passing through the structure 1 according to the embodiment is smaller than the pressure loss of the exhaust gas passing through the conventional exhaust gas purification filter of the wall-flow type.

The exhaust gas introduced into the structure 1 surely contacts the first catalyst 30 and the second catalyst 50 for the predetermined period in the predetermined order, which allows the efficient purification of the exhaust gas. Additionally, in the first area X which is close to the inlet end I, the exhaust gas does not pass through the partition wall 12, thereby suppressing the accumulation of the PM and ash in the exhaust gas on the first surface 12a of the partition wall 12. This allows the structure 1 to maintain the high exhaust gas purification performance.

The structure according to the embodiment can be used as an exhaust gas purification filter in an exhaust gas purification device. The exhaust gas purification device is applicable to various kinds of vehicles with internal combustion engines.

While the embodiment of the present disclosure has been described in detail above, the present disclosure is not limited thereto, and can be subjected to various kinds of changes in design without departing from the spirit and scope of the present disclosure described in the claims.

DESCRIPTION OF SYMBOLS

1 Structure
10 Substrate
11 Frame
12 Partition wall
14 First cell (inlet cell)
16 Second cell (outlet cell)
30 First catalyst
32 First catalyst layer
50 Second catalyst
60 Sealer
I First end (inlet end)
J Second end (outlet end)
K First position
L Second position
X First area
Y Second area
Z Third area

What is claimed is:

1. A structure comprising:
    a substrate including a first end, a second end, and a porous partition wall defining a plurality of cells extending between the first end and the second end;
    a first catalyst; and
    a second catalyst,
    wherein the plurality of cells include:
        a first cell opened on the first end and sealed on the second end; and
        a second cell adjacent to the first cell with the partition wall interposed between the second cell and the first cell, the second cell being sealed on the first end and opened on the second end,
    wherein the structure includes:
        a first area between the first end and a first position distant from the first end by a first distance along an extending direction of the plurality of cells;
        a second area between the first position and a second position distant from the first position by a second distance toward the second end along the extending direction of the plurality of cells; and
        a third area between the second position and the second end,
    wherein in the first area, the first catalyst is disposed on a first surface of the partition wall, the first surface facing the first cell, and the partition wall with the first catalyst disposed on the partition wall is impermeable to gas,
    wherein in the second area, the first catalyst is not provided, the second catalyst is disposed in a region including at least a part inside the partition wall, the part facing the first cell, and the partition wall with the second catalyst disposed in the partition wall is permeable to gas, and
    wherein in the third area, any of the first catalyst or the second catalyst is not provided, and the partition wall is permeable to gas.

2. The structure according to claim 1,
    wherein in the first area, the second catalyst is disposed in a region including at least a part inside the partition wall, the part facing the first cell.

3. An exhaust gas purification device comprising the structure according to claim 1.

* * * * *